Oct. 15, 1963 J. DUNNOUS 3,107,034
LIQUID SUPPLY AND MIXING SYSTEM
Filed Jan. 29, 1962

INVENTOR:
JACK DUNNOUS
BY Howson & Howson
ATTYS.

United States Patent Office 3,107,034
Patented Oct. 15, 1963

3,107,034
LIQUID SUPPLY AND MIXING SYSTEM
Jack Dunneous, 2200 Benjamin Franklin Parkway,
Philadelphia, Pa.
Filed Jan. 29, 1962, Ser. No. 169,399
11 Claims. (Cl. 222—70)

This invention relates to a liquid supply and mixing system for accurately proportioning and supplying a plurality of liquid components of a mixture which can be delivered at a variable rate at selected time periods, and has for an object the provision of improvements in this art.

The invention has very advantageous application to, although not limited to, the mixing of the plural components of reactive plastic material where the time and rate of supply required may vary widely but where the proportion of ingredients supplied must be very accurately controlled and maintained. As examples, the components of epoxies, polyurethane, liquid elastomers, and the like may be mentioned. Foaming plastics formed in advancing sheets offer an excellent example of the practical use of the invention.

The invention makes use of a circulated hydraulic fluid, such as oil, the viscosity of which can be closely controlled, as the power transmission means for operating a plurality of pumps for the mixture component fluids (liquids) to be delivered.

The invention also makes use of directly connected motor-pump assemblies, preferably of the cylinder-piston type, in which the relative areas of motor and pump effective surfaces remain a constant.

The invention also makes use of a common timing control for the several power drive units and the motor control valves.

It is an object of the invention to provide a power and pumping system which is capable of supplying a plurality of liquid components of a mixture of a definite and constant ratio and without the necessity of making frequent and troublesome adjustments.

Another object of the present invention is to provide a system for accurately proportioning and supplying a plurality of liquid components of a mixture in which the ratio of the components supplied may be readily determined and the ratio adjusted if necessary while the system is operating and in use, and also wherein the rate of supply may be varied without varying the ratio of components being supplied.

Another object is to provide such a system using simple and reliable components which accurately maintain dependable performance with a minimum of supervision.

Figure 1:
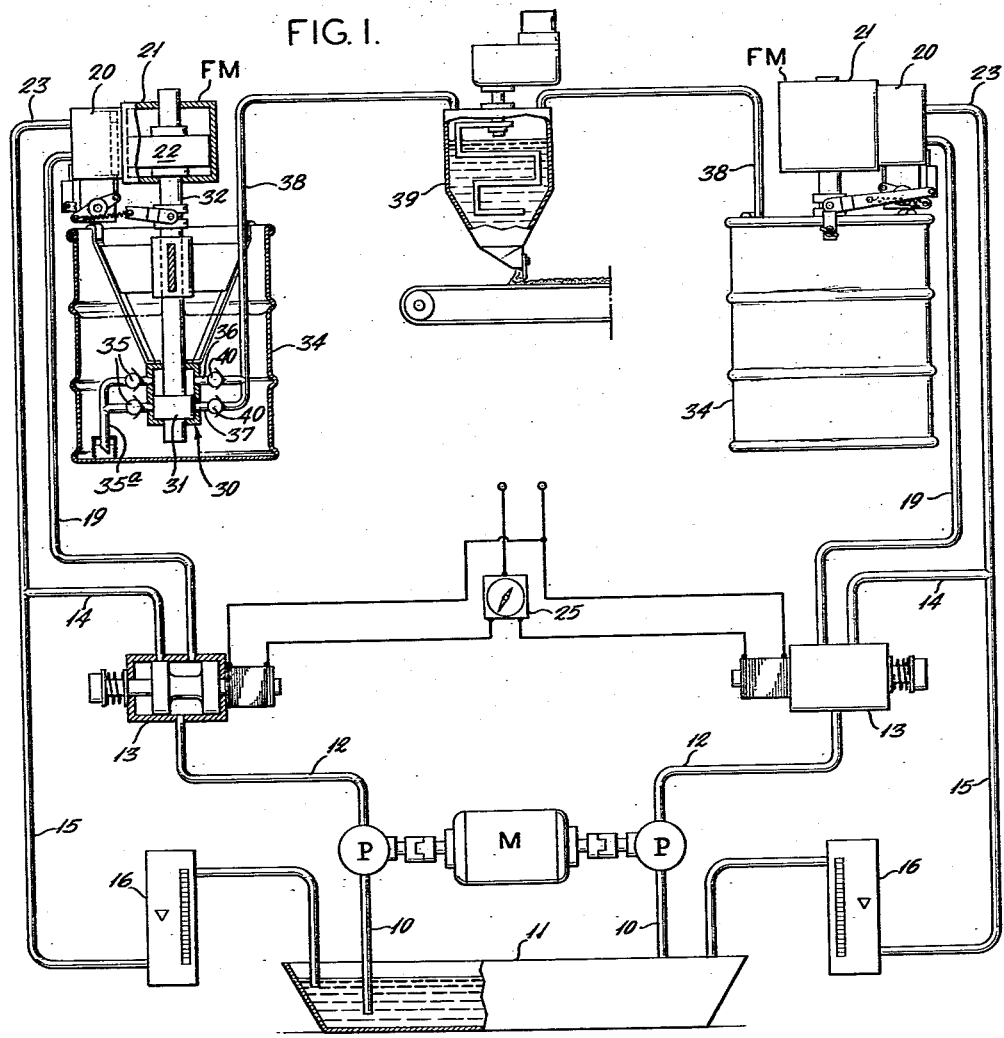
Figure 2:
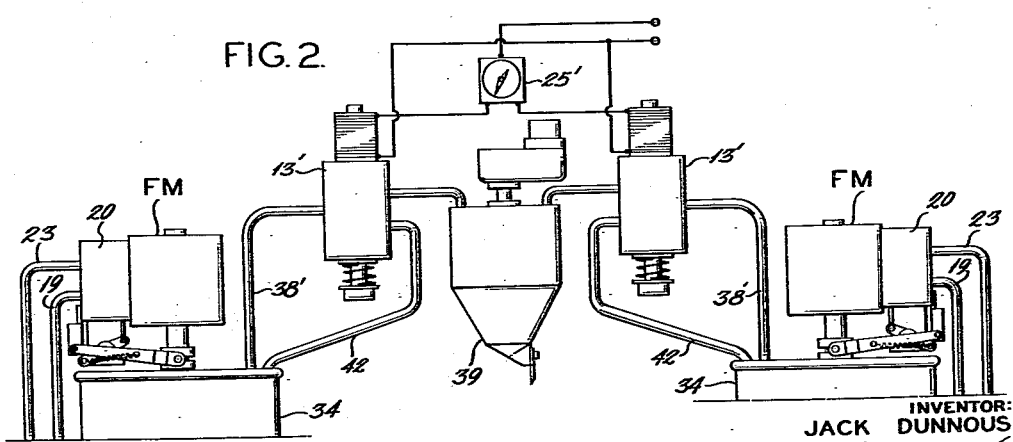

The above and other objects as well as various novel features and advantages of the invention will be apparent from the following description of an exemplary embodiment, reference being made to the accompanying drawings thereof wherein:

FIG. 1 is a schematic and diagrammatic view of a metering and mixing system embodying the invention; and FIG. 2 is a similar view of a modification.

The system comprises two more or less separate and distinct sub-systems, namely, the hydraulic power and control system and the resin metering pump system.

The hydraulic power and control system provides the metering and proportional control of a plurality (two or more) of streams of hydraulic power fluid. It also furnishes the hydraulic power necessary to operate the resin metering pumps.

A plurality of rotary hydraulic pumps P of constant-displacement variable-delivery (piston pumps, for example) are operated by one or more electric motors M, the speed of which can be varied and very accurately controlled.

The intake of each pump is by way of an inlet pipe 10 from a common source such as sump or reservoir 11 and the discharge is by way of an outlet pipe 12 to a three-way electrically operated valve 13 which controls the direction of flow of power fluid for either active or idle periods.

When the valve 13 is de-energized, the hydraulic fluid returns by a by-pass pipe line 14 and a common return pipe line 15 to the sump 11. The return is through a flowmeter such as a rotameter 16 which indicates the flow rate of the hydraulic fluid at the particular flow setting of the pump P.

When the valve 13 is energized it directs the power fluid through a supply line 19 to the valve 20 of a reciprocating fluid motor FM, here of the piston-cylinder type. The fluid flows into one end or the other of the cylinder 21 of the fluid motor, which end depending on the position of the valve 20, and at the same time fluid is discharged by the piston 22 from the other end of the cylinder through the valve 20 into a discharge pipe 23. The discharge pipe 23 connects with the sump pipe line 15 which causes the returning fluid to flow through the flowmeter 16, as before during idling.

In each case, whether the power fluid is operating the fluid motor during active periods or being returned directly to the sump during idling periods, the flow of power fluid is very accurately regulated and metered.

The valves 13 are shifted between sump return pipes 14 and work supply pipe 19, all simultaneously, by a timer 25 set to operate on any desired schedule.

The operating details of the piston travel-reversing valve 20 are not completely shown because it is such a common and well-known device, whether operated mechanically by a piston-connected part or operated by solenoid reversing means, or otherwise, that its structure and operation will be obvious to those skilled in the art.

The fluid metering pump system, for resin for example, includes metering pumps 30 which here are of the single-piston, double-acting reciprocating type having the pump piston 31 connected directly to the motor piston 22 by the piston rod 32. The entire pump cylinder 33 is set down and suitably anchored in the bottom of an exchangeable supply tank 34. Inlet check valves 35 and an intake pipe 35a are provided to permit flow from the tank 34 into the pump cylinder.

Fluid is forced from the pump 30 by feed pipe lines 36 and 37 joining in a common feed pipe line 38 leading to a mixing and dispensing element or head 39, the pipes 36 and 37 being provided with suitable check valves 40 to control the direction of flow of the fluid.

The piston rod 32 is of such size within the fluid motor cylinder and pump cylinder respectively that the larger and smaller effective piston areas of the fluid motor and the pump respectively always have the same ratio so that for a given volume of power fluid metered to the fluid motor a constant volume ratio of mixture fluid will be pumped at all times. For example, if the head end area of the power fluid motor piston is twice the area of the connecting rod end area of that piston, then the head end area of the mixture fluid pump piston (which is moved to pump fluid by the head end of the fluid motor piston) will be twice the area of the connecting rod end of the pump piston.

With this arrangement of constant ratio of motor-pump piston areas, the flowmeters will indicate the actual flow rate of each reactive liquid component.

In the modification shown in FIG. 2 the three-way valves 13 are placed in the pump delivery lines 38' instead of in the power fluid line 19; and return pipe lines 42 are provided from the three-way valves back to the tanks 34. The timer 25' now control the three-way valves 13', mixture fluids being pumped continuously. This arrangement maintains the mix-component liquids in a uniform condition in the supply pipe lines and supply tanks. This is especially useful when heaters are employed.

In operation, the motor M drives the pumps P at such variable selected speed as may be required for material delivered by the mixer 39. Each pump P can be separately adjusted to deliver the proper proportion of power fluid as may be required to deliver the proper proportion of mixture component, this being easily arranged since the proportions of power fluid to pumped fluid are definitely established at the fluid motor-component pump unit; since the rate of flow of the power fluid is accurately metered at the flowmeter 16; and since the power fluid at any time has the same viscosity for all fluid motors due to constant return and mixing of power fluid in the sump 11. Furthermore, with a piston type pump for the power fluid, accuracy is further assured since any change in viscosity of the power fluid due, for example, to a temperature change, will not affect the output of the power fluid pump. This provides greater accuracy than in conventional systems wherein the flow of component fluids is directly measured as certain of these fluids may change in viscosity drastically with a small change in temperature thereby affecting the reading of the flow measuring instrument.

In the modification of FIG. 2 the rate of flow of the mixture component is directly metered and the fluid is recirculated when not used.

The timer 25 or 25' by control of the three-way valves 13 or 13' monitors the flow of all fluids simultaneously from the mixer 39 according to any desired pre-arranged schedule.

It will be seen from the above description that the invention provides simple, accurate and dependable means for delivering a plurality of mixture components in constantly maintained extremely accurate predetermined proportions and for delivering the mixture at such times and at such rates as may be desired.

Consequently, when such materials as plastics are dealt with where the quality of the product so completely depends upon the strict maintenance of exact proportions at all times, the invention in a fairly simple manner satisfies a long-existing need.

While the timing means specifically shown herein contemplates total cut-off and re-starting of the mixture fluids, it will be appreciated that the control will apply as well to flow modulation during delivery where total cut-off is not contemplated. This is readily effected as by a scheduled control of the speed of the motor M.

While one embodiment and one modification of the invention have been described for purposes of illustration, it is to be understood that there may be various embodiments and modifications within the general scope of the invention.

I claim:

1. A liquid supply and mixer delivery system comprising in combination, a plurality of variable volume power fluid pumps, power means of variable speed arranged to drive all of said power fluid pumps at the same speed relationship, a common source of hydraulic power fluid and means to supply said hydraulic power fluid to said power fluid pumps, power fluid operated motors for pumping separate mixture fluid components, mixture component fluid pumps operated by said power fluid motors which deliver mixture component fluids in a fixed volumetric ratio relative to the volume flow of power fluid which operates said power fluid motors, means for supplying power fluid from said power fluid pumps to said power fluid motors, a mixing and delivery unit, means to supply mixture component fluids from said plurality of mixture component pumps to said mixing and delivery unit, means for separately metering the flow of power fluid for each power fluid pump, means for by-passing the fluid delivered from one of said plurality of power fluid pumps and mixture fluid component pumps back to its source of supply, and timing means acting simultaneously to control all of said by-pass means.

2. A liquid supply and mixer delivery system as set forth in claim 1, wherein said by-pass means is provided for said power fluid.

3. A liquid supply and mixer delivery system as set forth in claim 1, wherein said by-pass means is provided for said mixture component fluids.

4. A liquid supply and mixer delivery system as set forth in claim 1, wherein said power fluid motor is a double-acting reciprocating cylinder-piston type and said mixture component fluid pump is a double-acting reciprocating cylinder-piston type, the power fluid motor being directly connected to the mixture component fluid pump to drive it, and the piston ratios of motor and pump areas being a constant for action in both directions.

5. A liquid supply and mixer delivery system as set forth in claim 1, wherein a single variable speed electric motor is connected to drive all of said power fluid pumps.

6. A liquid supply and mixer delivery system, comprising in combination, a first group of a plurality of variable volume power fluid delivery pumps, variable speed power means arranged to drive all of said first group of pumps, a common source of hydraulic power fluid for all of said first group of pumps, means to supply power fluid from said source separately to all of said first group of pumps, power fluid operated motors for each of a plurality of mixture fluid components, means for delivering power fluid from said first group of pumps to said power fluid operated motors, means for returning used power fluid from said power fluid motors to said source, means for metering the flow of power fluid produced by each of said first group of pumps, a second group of a plurality of mixture fluid delivery pumps, a separate source of mixture fluid for each of said second group of pumps, said power fluid motors being arranged to operate said mixture fluid pumps, a mixture fluid mixing and delivery unit, separate supply pipe lines from said second group of pumps to said mixing and delivery unit, means for separately metering the flow of power fluid from each of said first group of pumps, means for by-passing the fluid delivered from each of said pumps of one of said first and second group of pumps back to the source of supply, and timing means acting on all of said by-pass means to simultaneously control the flow of mixture fluid from all of said second group of pumps to said mixing and delivery unit.

7. A liquid supply and mixer delivery system, comprising in combination, at least two continuous flow power fluid pumps, power means to drive said power fluid pumps at a predetermined speed relationship, means to vary the rate of flow of one of said power fluid pumps relative to the other, a source of hydraulic power fluid and means to supply said hydraulic power fluid to said power fluid pumps, at least two power fluid operated motors for pumping separate mixture fluid components, mixture fluid component pumps operated by said power fluid motors to deliver mixture fluid components in a predetermined volumetric ratio relative to the volume flow of power fluid which operates said power fluid motors, means for supplying power fluid from said power fluid pumps to said power fluid motors, means for by-passing the fluid delivered from one of said power fluid pumps and said mixture fluid component pumps back to its source of supply, a mixing and delivery unit, and means to supply mixture fluid components from said mixture fluid component pumps to said mixing and delivery unit.

8. A liquid supply and mixer delivery system, comprising in combination, at least two continuous flow power fluid pumps, power means to drive said power fluid pumps at a predetermined speed relationship, means to vary the rate of flow of one of said power fluid pumps relative to the other, a source of hydraulic power fluid and means to supply said hydraulic power fluid to said power fluid pumps, at least two power fluid operated motors for pumping separate mixture fluid components, mixture fluid component pumps operated by said power fluid motors to deliver mixture fluid components in a predetermined volumetric ratio relative to the volume flow of power fluid which operates said power fluid motors, means for supplying power fluid from said power fluid pumps to said power fluid motors, means for by-passing the fluid delivered from one of said power fluid pumps and said mixture fluid component pumps back to its source of supply, a mixing and delivery unit, means to supply mixture fluid components from said mixture fluid component pumps to said mixing and delivery unit, and means for separately metering the flow of power fluid for each power fluid pump.

9. A liquid supply and mixer delivery system, comprising in combination, a plurality of power fluid pumps, power means to drive said power fluid pumps at a predetermined speed relationship, a source of hydraulic power fluid and means to supply said hydraulic power fluid to said power fluid pumps, power fluid operated motors for pumping separate mixture fluid components, mixture fluid component pumps operated by said power fluid motors to deliver mixture fluid components in a predetermined volumetric ratio relative to the volume flow of power fluid which operates said power fluid motors, means for supplying power fluid from said power fluid pumps to said power fluid motors, a mixing and delivery unit, means to supply mixture fluid components from said plurality of mixture fluid component pumps to said mixing and delivery unit, means for separately metering the flow of power fluid for each power fluid pump, separate means for bypassing the fluid delivered from each of said plurality of power fluid pumps back to said source of hydraulic power fluid, and timing means to control said bypass means.

10. A liquid supply and mixer delivery system, comprising in combination, a plurality of power fluid pumps, power means to drive said power fluid pumps at a predetermined speed relationship, a source of hydraulic power fluid and means to supply said hydraulic power fluid to said power fluid pumps, power fluid operated motors for pumping separate mixture fluid components, mixture fluid component pumps operated by said power fluid motors to deliver mixture fluid components in a predetermined volumetric ratio relative to the volume flow of power fluid which operates said power fluid motors, means for supplying power fluid from said power fluid pumps to said power fluid motors, a mixing and delivery unit, means to supply mixture fluid components from said plurality of mixture fluid component pumps to said mixing and delivery unit, means for separately metering the flow of power fluid for each power fluid pump, separate means for bypassing the fluid delivered from each of said plurality of power fluid pumps back to said source of hydraulic power fluid, and timing means to control said bypass means, said bypass means passing through said metering means.

11. A liquid supply and mixer delivery system, comprising in combination, a plurality of power fluid pumps, power means to drive said power fluid pumps at a predetermined speed relationship, a source of hydraulic power fluid and means to supply said hydraulic power fluid to said power fluid pumps, power fluid operated motors for pumping separate mixture fluid components, mixture fluid component pumps operated by said power fluid motors to deliver mixture fluid components in a predetermined volumetric ratio relative to the volume flow of power fluid which operates said power fluid motors, means for supplying power fluid from said power fluid pumps to said power fluid motors, a mixing and delivery unit, means to supply mixture fluid components from said plurality of mixture fluid component pumps to said mixing and delivery unit, means for separately metering the flow of power fluid for each power fluid pump, means for bypassing the mixture fluid components from said mixture fluid pumps back to the source of supply of said mixture fluid components, and timing means to control said bypass means.

References Cited in the file of this patent
UNITED STATES PATENTS 2,946,488    Kraft _____ July 26, 1960